T. C. SIME.
SEED CORN DRIER.
APPLICATION FILED DEC. 18, 1911.
1,027,672.
Patented May 28, 1912.
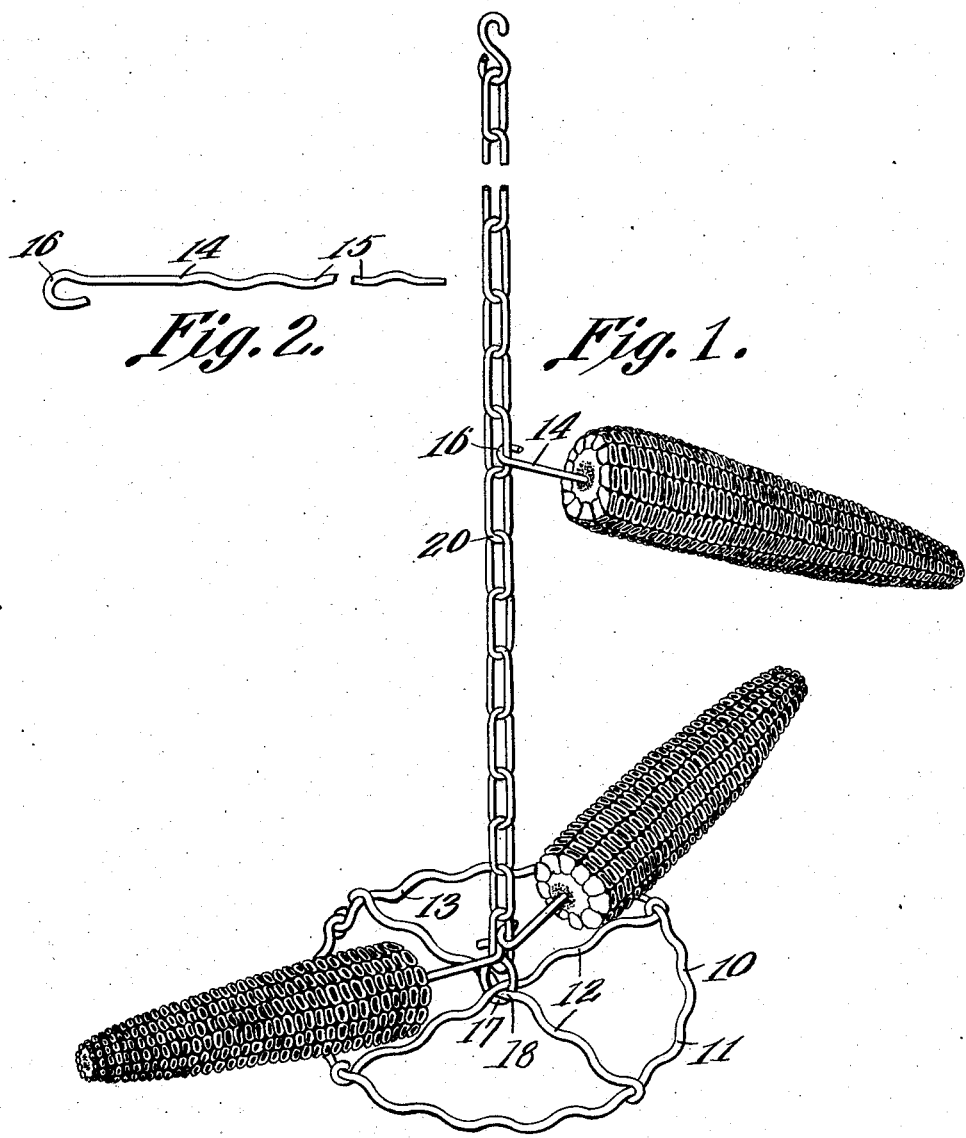
Witnesses
Thomas C. Sime,
Inventor
by
Attorneys

UNITED STATES PATENT OFFICE.

THOMAS C. SIME, OF NEVADA, IOWA.

SEED-CORN DRIER.

1,027,672.  Specification of Letters Patent.  Patented May 28, 1912.

Application filed December 18, 1911. Serial No. 666,471.

*To all whom it may concern:*

Be it known that I, THOMAS C. SIME, a citizen of the United States, residing at Nevada, in the county of Story and State of Iowa, have invented a new and useful Seed-Corn Drier, of which the following is a specification.

This invention relates to an improvement in driers for seed corn.

The primary object of the invention is to provide an easily constructed support which will effectually support a quantity of ears of corn without taking up a great amount of space, the arrangement of the same being such that a complete circulation is secured.

In the drawings Figure 1 is a perspective view. Fig. 2 is a detail view of one of the ear supports removed.

In the drawings, 10 designates a fluted annular member preferably formed of wire, the bent portions 11 of which are disposed upwardly. Arranged transversely of said annular member are a plurality of fluted bars 12 which may also be formed of wire, the bars intersecting at their centers, their end portions being bent to embrace the annular member.

The ears of corn are supported by the members 14, the portions 15 of which extend within the ears, said portion being fluted to prevent the displacement of the ears. The members 12 are connected by a hanger 17, the lower hook of the hanger rigidly embracing the members 12, the downwardly disposed bend 18 of one of the members 12 registering with an upwardly bent portion of the other member. The hanger is thus rigidly disposed at right angles to the members 12 and adapted to be supported by the chain 20, the links of which support the ear supports 14, each link of the chain accommodating three or four ears of corn. It will be noted that by this arrangement, a vertical column of corn is formed, a free circulation of air being secured, the air following the chain, the end portions of the ears being spaced from the said chain.

The lowermost circle of ears rest upon the fluted annular member, the curvature of said member preventing the ears from becoming displaced. It will be noted that by this construction that a great number of ears of corn may be supported, the same taking up comparatively little space as they are disposed in one compact column.

It will be seen that one or more ears may be removed without disturbing the other ears, the members 14 readily assuming different positions without adjustment.

Thus the support when complete filled with ears of corn consists of a vertical column, the structure providing a support which will be simple and economical to manufacture, and at the same time capable of supporting a great number of ears of corn, while taking up comparatively little space.

What is claimed is:

1. A support for ears of corn consisting of an annular member, a plurality of transversely disposed members which intersect at their centers, said members being fluted, a securing device embracing and rigidly engaging said transverse members at their points of intersection, and a flexible hanger connected to said securing device.

2. In a support for ears of corn a fluted annular member, a plurality of transversely disposed fluted members extending transversely of said member and secured to the same, and a hanger secured to said transversely disposed members.

3. A support for ears of corn consisting of a fluted annular member, a plurality of fluted members supported by said annular member, a hanger rigidly secured to said second mentioned members, and a plurality of fluted ear supporting members loosely supported by said hanger.

In testimony that I claim the foregoing as my own, I have hereto affixed my signature in the presence of two witnesses.

THOMAS C. SIME.

Witnesses:
E. F. BRIGGS,
H. D. CHAMBERLIN.

Copies of this patent may be obtained for five cents each, by addressing the "Commissioner of Patents, Washington, D. C."